April 7, 1959      S. H. REITER      2,880,614

TEMPERATURE CONTROL DEVICE FOR STOVE BURNERS

Filed July 16, 1956

INVENTOR
Sydney H. Reiter
BY
ATTORNEYS

United States Patent Office 2,880,614
Patented Apr. 7, 1959

2,880,614

TEMPERATURE CONTROL DEVICE FOR STOVE BURNERS

Sydney H. Reiter, Mountainside, N.J., assignor to The Wilcolater Company, Newark, N.J., a corporation of Delaware Application July 16, 1956, Serial No. 597,965

3 Claims. (Cl. 73—368.4)

The present invention relates to temperature control devices, and more particularly to a novel and improved device for use in connection with the top burners of stoves for accurately regulating the application of heat to pans or heating vessels placed on the burners.

In order to thermostatically regulate the quantity of heat supplied to a pan or cooking vessel placed upon the top burners of a stove, it is conventional to employ temperature responsive control devices which contact the bottom of the pan and operate, in response to the temperature of the pan, to regulate the quantity of heat supplied by the burner. In general, such conventional devices comprise an assembly which is mounted in the center of the burner and has a movable element projecting upwardly above the top level of the burner. The movable element is urged resiliently upward, and is depressed and held firmly in contact with the bottom of a pan placed on the burner. The movable element may be in the form of a bulb containing expansible fluid and when the fluid is heated it expands and operates through other control mechanisms of conventional design to regulate the heat supplied by the burner.

The control device of the present invention constitutes an improvement over prior devices in that an improved arrangement is provided for isolating the heat sensitive thermostatic element, so that during operation of a burner the control device will be effected only by the temperature of the cooking vessel, and not to any substantial extent by heat radiated or conducted thereto from parts of the burner. In this respect, it is understood that various arrangements for shielding the heat sensitive element from the heat of the burner flame have been proposed. However, the new device incorporates specific improvements providing greater effectiveness in the shielding or protecting of the heat sensitive element from external heat, while at the same time providing for substantial efficiency and economy in the manufacture of the device.

More specifically, the invention provides a temperature control device of the type described which both shields and insulates the bottom and sides of the heat sensitive element, when the element is held in contact with the bottom of a cooking vessel, so that the element is substantially unaffected by heat directed or radiated from sources other than the cooking vessel itself.

For a better understanding of the invention, reference should be made to the following detailed description and accompanying drawings, in which.

Figure 1:
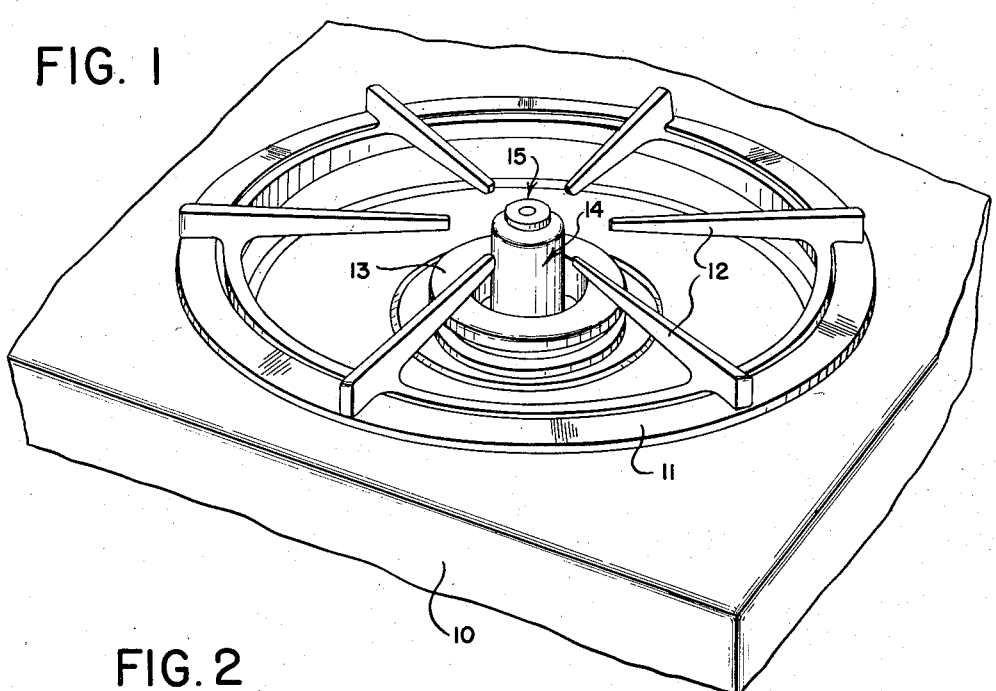
Fig. 1 is a fragmentary perspective view of a conventional gas stove, showing one of the top burners of the stove with which a control device of the improved type is associated.

Referring now to the drawings, the numeral 10 designates generally a conventional stove, which may be of a gas or electric type. The illustrated stove 10 is of the gas-operated type and has a burner 11 defined by a recess in the top surface of the stove and covered by a suitable grate 12 adapted to support a cooking vessel. Below the grate 12 is an annular burner element 13, which may be of any conventional type. As a general rule, the burner elements 13 are such that gas flames are directed generally upward and radial outward of the element.

Mounted on the stove 10, concentric with the burner element 13, is a temperature control device generally designated by the numeral 14. The control device 14 includes a heat sensitive element 15 which projects above the top surface of the grate 12. Accordingly, when a cooking vessel is placed upon the grate 12 the heat sensitive element 15 is engaged and depressed.

In accordance with usual practice, the heat sensitive element 15 is maintained in contact with the cooking vessel during heating thereof, and the temperature of the vessel and its contents is sensed by the element 15. Through suitable intermediate means, not shown, the condition of the heat sensitive element 15 forms a basis for controlling the rate of gas flow through the burner element 13, or in the case of electric burners to control the rate of current flow.

Figure 2:
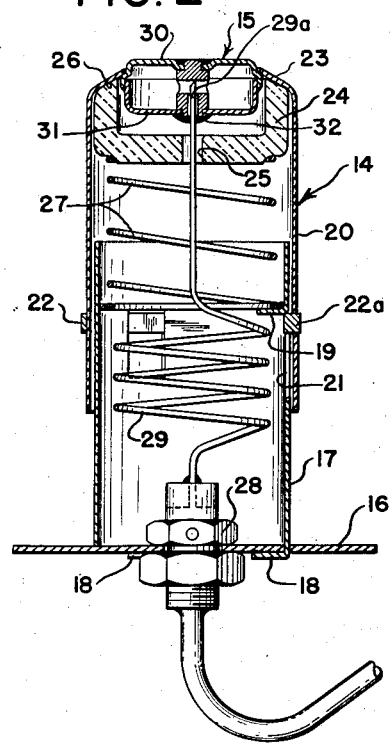
Fig. 2 is a longitudinal cross-sectional view of the improved control device.
Figure 3:
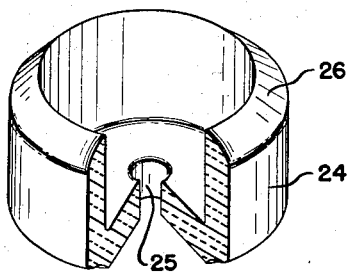
Fig. 3 is an enlarged perspective view, partly in section, illustrating one of the improved components of the device of Fig. 2.

Referring now to Fig. 2, the numeral 16 designates a flat plate forming part of the stove 10 and lying generally below the burner assembly 11. Mounted on the plate 16 is a cylindrical sleeve 17, formed of light gauge sheet metal. The sleeve 17 has one or more axially extending tabs 18 at its lower end by means of which the sleeve may be secured to the mounting plate 16. Near its upper end, the sleeve 17 has a plurality of circumferentially spaced integral tabs 19 which project radially inward of the side wall of the sleeve.

Slidably received over the sleeve 17, which may be referred to as the mounting sleeve, is a second cylindrical sleeve 20. The sleeve 20 constitutes a shield, as will be more fully explained, and is freely movable up and down on the mounting sleeve 17. In the illustrated device, the mounting sleeve 17 has an elongated vertically disposed slot 21 in its side wall in which is received a key-like projection 22a of a retaining spring 22. The slot 21 and retaining spring 22 serve to prevent relative rotation between the mounting and shielding sleeves 17, 20 and to limit the extent of vertical movement of the shielding sleeve 20 with respect to the mounting sleeve 17.

At the top of the shielding sleeve 20 the walls thereof are bent upwardly and inwardly, as at 23, to define a partial upper wall. Received within the shielding sleeve, and normally held in engagement with the upper wall 23 thereof is an insulating element 24 formed of ceramic or other suitable material. The insulating element 24 is, in accordance with the invention, generally in the form of a cup, having a small vertical opening 25 in its bottom wall. The side walls of the insulating element 24 are generally vertical, and have inclined upper surfaces complementary to the inclined upper wall 23 of the shielding sleeve 20. The insulator 24 has a diameter somewhat less than that of the shielding sleeve 20, and thus fits easily within the latter. In its assembled position, the insulator 24 lies at the top of the sleeve 20, with the angular upper surfaces 26 of the insulator engaging the upper wall 23 of the sleeve. The insulating element 24 is held in its assembled position by means of a spring 27 acting on the bottom of the insulator and upon the tabs 19 projecting inwardly of the mounting sleeves 17. The spring 27 is normally compressed and therefore urges the insulating element 24 upwardly in the shielding sleeve 20. This not only holds the insulating element 24 in place, but urges the shielding sleeve 20 upwardly to the full extent provided by the slot 21 and retaining spring 22.

Secured to the mounting plate 16, by means of an appropriate fitting 28, is a tubular member 29, which is bent in the form of a spring near the fitting 28 and has a straight portion extending vertically through the coil spring 27 and secured to the heat sensitive element 15. The element 15, in the illustrated apparatus, is formed of a pair of stamped cup-shaped parts 30, 31 which are soldered or otherwise secured together to form a sealed bulb. The lower member 31 of the element has a central opening therein through which the tube 29 extends, after passing through the vertical opening 25 in the insulating element 24. The upper portion 29a of the tube is soldered or otherwise secured to the element 15, as at 32.

As indicated in Fig. 2, the upper part 30 of the element 15 is of slightly greater diameter than the opening defined by the upper wall 23 of the shielding sleeve 20. The arrangement is such that the upper portion of the element 15 may project slightly above the shielding sleeve 20, while at the same time the bulb is confined generally within the sleeve 20. The inside diameter of the cup-like insulating element 24 is slightly greater than that of the element 15, and the bottom of the recess formed in the element 24 lies below the bottom of the element 15. The element 15 is free to move vertically with respect to the insulating element 24 and shield 20, through a limited distance, but is normally held in its uppermost position by the spring-like tube 29 which maintains an upward force on the element at all times.

In the complete burner assembly, including the temperature control device 14, the mounting and shielding sleeves 17, 20 are so arranged on the stove that the top edge of the shielding sleeve 20 projects somewhat above the top surface of the grate 12. The heat sensitive element 15, in turn, projects above the shielding sleeve 20. When a cooking vessel is placed upon the grate, the weight of the vessel causes the heat sensitive element to be depressed. The element 15 is supported independently of the shield 20 and insulating member 24, and is therefore depressed into the recess of the insulating element 24. After the heat sensitive element 15 has been depressed a short distance by the cooking vessel, the bottom of the vessel engages the top edge of the shielding sleeve 20, causing the latter to be depressed against the action of the spring 27. When the vessel rests upon the grate 12 the element 15 will be urged into pressure contact with the bottom of the vessel by means of the tubular spring-like element 29. The shielding sleeve 20 is urged against the bottom of the pan by the spring 27, the shield surrounding the element 15 so that the flames and hot combustion products do not reach the heat sensitive element 15.

In control devices of heretofore-known design a heat sensitive element has been used in combination with some form of shielding device for preventing the flames or hot combustion gases from acting directly upon the heat sensitive element. However, in cases where the burner is in use for extended periods of time, the shield 20, mounting plate 16 and other parts of the stove and burner may become heated to a considerable extent, and cause heat to be reflected and otherwise transmitted toward the heat sensitive element 15. Thus, with prior designs, the temperature control afforded has been subject to considerable error due to the fact that the heat sensitive element 15 is acted upon from sources other than the cooking vessel itself. This difficulty is substantially obviated by the present invention in that the relatively heavy-walled insulating element 24 of ceramic or other material completely surrounds the sides and bottom of the heat sensitive element 15 when the element is in contact with a cooking vessel. The shield 20 acts to reflect certain of the heat rays, and to prevent the direct application of the flame and hot gases to the element 15. However, whereas the shield 20 alone is not entirely effective, particularly after the burner has been in use for some time, the use of the shield in combination with an insulating member surrounding the bottom and sides of the element substantially isolates the element from the effects of heat emanating from any source other than the cooking vessel itself. By this means the temperature control device may have substantially improved accuracy and is highly responsive to the temperature conditions of the vessel.

Having thus described a preferred form of my invention, what I claim as new and desire to secure by Letters Patent is:

1. A top burner temperature control device comprising a cylindrical mounting sleeve adapted to be secured to a stove generally below a top burner thereof, a cylindrical shielding sleeve slidably and telescopically engaged with said mounting sleeve and having an opening in its top, a heat sensitive element having a portion projecting upwardly through said opening, spring means mounting said heat sensitive element, said element being of substantially smaller diameter than said shielding sleeve and being positioned in substantially concentric relation thereto, and a cup-shaped member of insulating material surrounding the side and bottom walls of said heat sensitive element, characterized further by said shielding sleeve having an inturned lip about its upper edge defining said opening, said heat sensitive element having a portion intermediate its top and bottom which is of greater dimensions than said opening, and said insulating element having an upwardly opening recess therein having dimensions substantially equal to those of said heat sensitive element, whereby said element may be received in said recess when said element is urged downwardly in said shielding sleeve.

2. A top burner temperature control device comprising a cylindrical mounting sleeve adapted to be secured to a stove generally below a top burner thereof, a cylindrical shielding sleeve slidably and telescopically engaged with said mounting sleeve and having an opening in its top, a heat sensitive element having a portion projecting upwardly through said opening, spring means mounting said heat sensitive element, said element being of substantially smaller diameter than said shielding sleeve and being positioned in substantially concentric relation thereto, a cup-shaped member of insulating material surrounding the side and bottom walls of said heat sensitive element, and a spring acting upwardly on said insulating member, said shielding sleeve having means thereon to limit the upward movement of said insulating member with respect to said shielding sleeve.

3. A top burner temperature control device comprising a cylindrical mounting sleeve adapted to be secured to a stove generally below a top burner thereof, a cylindrical shielding sleeve slidably and telescopically engaged with said mounting sleeve and having an opening in its top, a heat sensitive element having a portion projecting upwardly through said opening, spring means mounting said heat sensitive element, said element being of substantially smaller diameter than said shielding sleeve and being positioned in substantially concentric relation thereto, and a cup-shaped member of insulating material surrounding the side and bottom walls of said heat sensitive element, characterized further by said spring means having a portion connected to said heat sensitive element and extending vertically downward therefrom and said insulating member having a small diameter vertical opening in its bottom wall through which the vertically extending portion of said spring means extends.

References Cited in the file of this patent

UNITED STATES PATENTS

| | | |
|---|---|---|
| 2,303,012 | Weber | Nov. 24, 1942 |
| 2,500,061 | Clark | Mar. 7, 1950 |
| 2,534,097 | Akeley | Dec. 12, 1950 |
| 2,699,487 | Turner | Jan. 11, 1955 |
| 2,806,122 | Thunander | Sept. 10, 1957 |